Aug. 12, 1924.
C. O. CARLSON
1,504,212
SPECTACLE HINGE CONSTRUCTION
Filed April 3, 1922
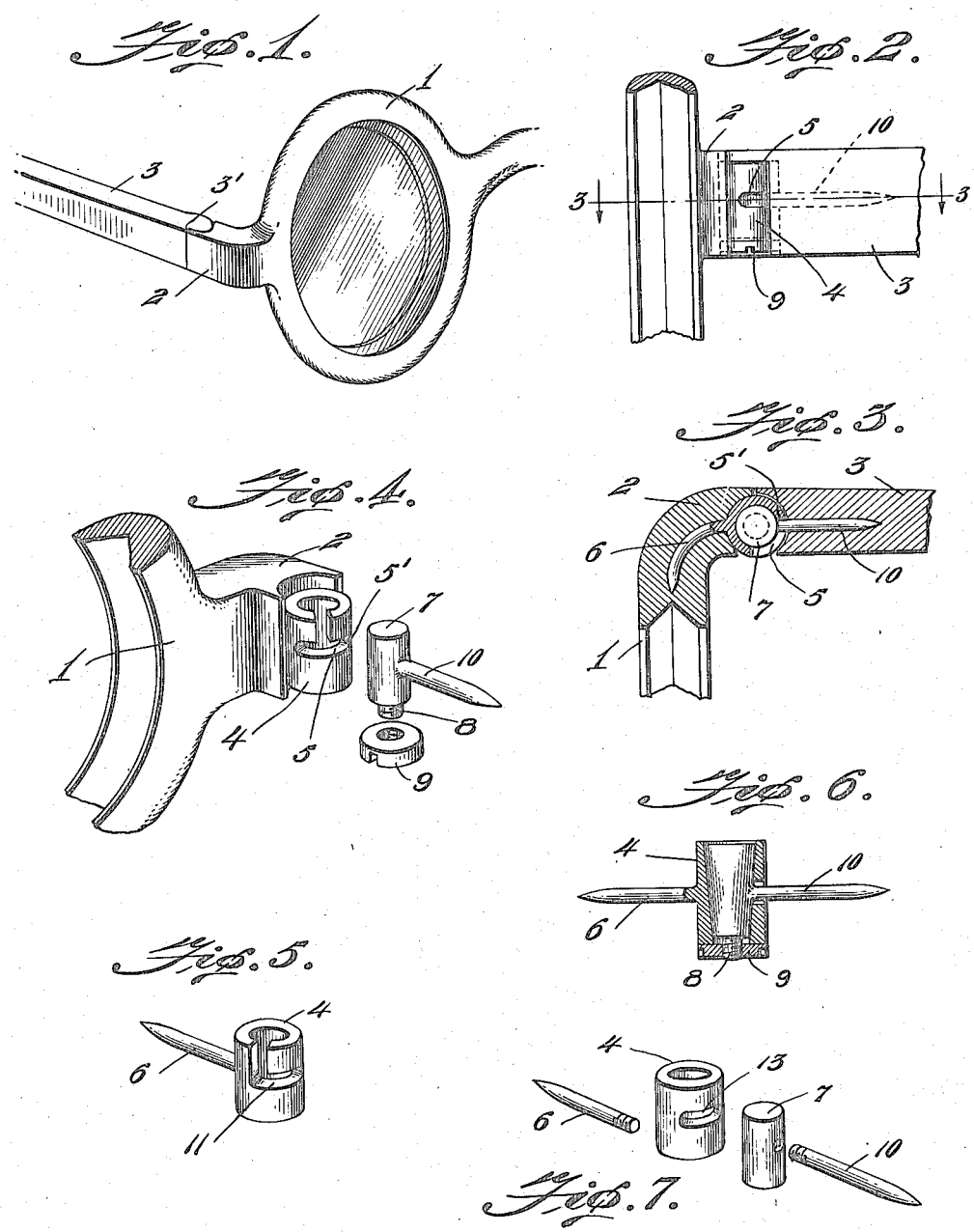
INVENTOR.
Charles O. Carlson
BY Thomas A. Jenckes Jr.
ATTORNEY Patented Aug. 12, 1924.

UNITED STATES PATENT OFFICE.

CHARLES O. CARLSON, OF PROVIDENCE, RHODE ISLAND.

SPECTACLE-HINGE CONSTRUCTION.

Application filed April 3, 1922. Serial No. 548,906.

*To all whom it may concern:*

Be it known that I, CHARLES O. CARLSON, a citizen of the United States, residing at Providence, in the county of Providence and State of Rhode Island, have invented certain new and useful Improvements in Spectacle-Hinge Constructions, of which the following is a specification.

This invention relates to improvements in spectacle hinges and has particular reference to a type of hinge especially adapted for use in combination with a non-metallic frame and temple, and which when in use therewith exposes no metal parts to view.

Another object of the present invention is the provision of a hinge or joint of this type which eliminates the necessity of manually holding the lens frame and temple of a pair of spectacles in exact relation to each other while permanently securing them together, thus making possible great rapidity in assembling.

A further object of the present invention is the provision of a hinge or joint of the type described to which adjusting tension may be applied without strain of any nature being set up in the adjacent non-metallic parts.

A still further object of this invention is the provision of a hinge or joint of the character described in which the usual non-metallic hinge lugs formed on both lens frames and temple are dispensed with.

With these ends in view my invention consists in the construction and arrangements of parts hereinafter described and particularly pointed out in the claims.

In the accompanying drawings illustrating one embodiment of my invention:

Fig. 1 is a fragmentary perspective view of spectacle frame and a temple, connected by means of my improved hinge.

Fig. 2 is a fragmentary inner face elevation of a temple and lens frame showing my invention applied thereto.

Fig. 3 is a horizontal section taken on line 3—3 of Fig. 2.

Fig. 4 is a perspective view of a portion of a lens frame showing my hinge applied thereto and in a slightly disassembled position.

Fig. 5 is a detail view showing a modified form of sleeve member.

Fig. 6 shows a modification in which the journal member and the socket in the sleeve member are tapered.

Fig. 7 is a disassembled perspective view in which a further modification of my invention is illustrated.

In the drawings, in which similar reference characters denote corresponding parts throughout the several views, the numeral 1 designates a lens frame of the non-metallic variety provided with the usual end piece 2, to which is pivotally connected the temple 3.

In the present showing the temple 3 and the end piece 2 of the lens frame 1 are connected by means of my improved hinge or joint, comprising the sleeve or socket member 4, carried by the end piece 2, and the journal member 7, carried by the temple 3.

The sleeve or socket member 4 is provided with the T-shaped slot 5, opening towards the upper end thereof and a shank 6, projecting therefrom and adapted to be embedded in the end piece 2, of the lens frame 1, as shown in Fig. 3 of the drawings. The journal member 7 is provided at its lower end with the stud 8 upon which is adapted to be threaded the securing and adjusting nut 9. Extending from the journal member 7, is the shank 10, designed to be embedded in the temple 3 as shown in Fig. 3 of the drawings and which when the hinge is assembled has lateral pivotal movement in the horizontal portion of the T-shaped slot 5. The outer end 5′ of the slot 5 forms a limiting stop against a too great outward swing of the shank 10 and temple 3, thus preventing a chipping of the non-metallic members at the point 3′. Though I have shown the hinge concealing non-metallic portion 3′ as projecting from the temple 3, it is obvious that such a hinge concealing non-metallic portion 3′ may project from the end piece 2 of the lens frame without departing from the spirit of my invention, and therefore in the claims I employ the word "frame" broadly to include either the lens frame proper or the temple, referring to the lens frame specifically as the lens frame.

Fig. 5 of the drawings illustrates a sleeve or socket member having an L shaped slot 11 which may be substituted for the T-shaped slot shown in the preferred form shown in Figs. 1 to 4 inclusive.

Fig. 6 illustrates a modified construction of my hinge or joint, wherein the socket in the sleeve member 4 and the journal member pivotally mounted therein are tapered. This construction permits the adjusting tension and friction to be absorbed by the tapering walls of the socket and journal member. In all other respects this construction is the same as that of the preferred form.

Fig. 7 shows a form of my hinge or joint in which the sleeve or socket member 4 is provided with a straight horizontal slot 13, and in which the shanks 6 and 7 respectively of socket and journal members 4 and 7 are removably connected thereto.

In assembling a non-metallic spectacle frame equipped with my improved hinge or joint it is only necessary to insert the journal member 7 carried by the temple 3 into the sleeve or socket member 4 carried by the lens frame 1, allowing the shank 10 of the journal member to pass downwardly through the vertical part of the T-shaped slot 5, until brought to rest upon the bottom thereof. Reference to Fig. 3 will show that when the journal member 7 and the temple 3 are fixed together sufficient space is left to accommodate the wall of the sleeve or socket member 4. Next a slight turn of the temple to either right or left carries the shank 10 to one side or the other of the vertical opening of the T-shaped slot. The nut 9 may now be placed in position upon the threaded stud 8 and adjusted thereon to the proper degree of tension.

It will be seen that as the nut 9 is of the same maximum diameter as the sleeve or socket member 4, the lower portion of the sleeve member is gripped between the nut 9, bearing against its lower end, and the shank 10, bearing against the bottom surface of the T-shaped slot in which it swings, and therefore all strain of adjustment is taken up by the metal of the hinge and none is transmitted to any adjacent non-metallic part. It will be obvious that the nut 9 permanently secures the journal member 7 in its pivotal position within the sleeve or socket member 4, thus completing the assembly.

The above outlined process of assembly is used in all illustrated types of my improved hinge or joint, with the exception of that shown in Fig. 7, wherein the journal member and its shank must be assembled within the sleeve member before the journal member and temple are fixed together.

It is understood that my invention is not limited to the specific embodiments shown and that various deviations may be made therefrom without departing from the spirit and scope of the appended claims.

Having thus described my invention, what I claim as new and desire to secure by Letters Patent is:—

1. The combination with a non-metallic spectacle frame of a concealed metallic temple connecting hinge for connecting the temple thereto, having metallic bearing surfaces throughout its pivotal length, the frame having a non-metallic portion projecting over said hinge to conceal it from view.

2. The combination with a non-metallic spectacle frame, of a metallic hinge having metallic bearing surfaces throughout its pivotal length, for connecting the temple thereto, the temple having a non-metallic portion projecting over said hinge to conceal it from view.

3. The combination with a non-metallic spectacle frame of a metallic connecting hinge, comprising when assembled a substantially cylindrical metallic socket member secured to the lens frame, and a journal member carried by the temple having a substantially cylindrical metallic bearing portion oscillatable in said socket, said hinge thereby having metallic bearing surfaces throughout its pivotal length adapted to present metallic resistance to any adjusting strain.

4. The combination with a non-metallic spectacle frame of a metallic connecting hinge, comprising when assembled a substantially cylindrical metallic socket member secured to one portion of the frame, and a journal member carried by the other portion of the frame having a substantially cylindrical metallic bearing portion oscillatable in said socket, said hinge thereby having metallic bearing surfaces throughout its pivotal length adapted to present metallic resistance to any adjusting strain.

5. The combination with a non-metallic spectacle frame of a metallic connecting hinge, comprising when assembled a substantially cylindrical metallic socket member secured to the lens frame, and a journal member carried by the temple having a substantially cylindrical metallic bearing portion oscillatable in said socket, said joint thereby having metallic bearing surfaces throughout its pivotal length adapted to present metallic resistance to any adjusting strain, the temple having a non-metallic portion projecting over said joint to conceal it from view.

6. The combination with a non-metallic spectacle frame of a metallic connecting hinge, comprising when assembled a substantially cylindrical metallic socket member secured to one portion of the frame, and a journal member carried by the other portion of the frame having a substantially cylindrical metallic bearing portion oscillatable in said socket, said joint thereby having metallic bearing surfaces throughout its pivotal length adapted to present metallic resistance to any adjusting strain, the frame having a non-metallic portion projecting over said joint to conceal it from view.

7. The combination with a non-metallic spectacle frame of a metallic temple connecting hinge or joint comprising a sleeve or socket member carried by the lens frame, a T-shaped journal member carried by the temple, a T-shaped slot in the sleeve or socket member and means for adjustably and pivotally securing the journal member within the sleeve or socket member.

8. The combination with a non-metallic spectacle frame of a metallic temple connecting hinge or joint comprising a sleeve or socket member carried by the lens frame, a T-shaped journal member carried by the temple, a T-shaped slot in the sleeve or socket member, means for adjustably and pivotally securing the journal member within the sleeve or socket member and a metallic stop for limiting the pivotal movement of the journal member and temple.

9. The combination with a non-metallic spectacle frame of a metallic connecting hinge, comprising when assembled a socket member secured to the lens frame having a horizontal slot therein, and a journal member carried by the temple comprising a shank portion projecting through said slot in the socket member and limited in its oscillating movement by the edges thereof and embedded in the temple, and a bearing portion revoluble within said socket attached to said shank.

10. The combination with a non-metallic spectacle frame of a metallic connecting hinge, comprising when assembled a socket member secured to one portion of the frame having a horizontal slot therein and a journal member carried by the other portion of the frame comprising a shank portion projecting through said slot in the socket member and limited in its oscillating movement by the edges thereof and embedded in said portion, and a bearing portion revoluble within said socket attached to said shank.

11. The combination with a non-metallic spectacle frame of a metallic connecting hinge, comprising when assembled a socket member secured to the lens frame having a horizontal slot therein, and a journal member carried by the temple comprising a shank portion projecting through said slot in the socket member and limited in its oscillating movement by the edges thereof and embedded in the temple, and a bearing portion revoluble within said socket, the temple having a non-metallic portion projecting over said hinge to conceal it from view.

12. The combination with a non-metallic spectacle frame of a metallic connecting hinge, comprising when assembled a socket member secured to one portion of the frame having a horizontal slot therein, and a journal member carried by the other portion of the frame comprising a shank portion projecting through said slot in the socket member and limited in its oscillating movement by the edges thereof and embedded in said portion, and a bearing portion revoluble within said socket, the frame having a non-metallic portion projecting over said hinge to conceal it from view.

13. The combination with a non-metallic spectacle frame of a metallic connecting hinge, comprising when assembled a socket member secured to the lens frame having a horizontal slot therein, a journal member carried by the temple comprising a shank portion projecting through said slot in the socket member and limited in its oscillating movement by the edges thereof and embedded in the temple, and a bearing portion revoluble within said socket attached to said shank, and means connecting the journal member and socket member to adjustably brake the oscillating movement of the temple.

14. The combination with a non-metallic spectacle frame of a metallic connecting hinge, comprising a hollow socket member having a horizontal slot therein secured in a vertical position to the end of the lens frame, a journal member having a cylindrical bearing portion revoluble in said socket and a shank portion projecting through the horizontal slot in the socket, and limited in its oscillating movement by the edges thereof and embedded in the temple, said socket also having a slot leading from the upper end thereof to the horizontal slot to permit the shank portion of the journal member to be inserted therein.

15. The combination with a non-metallic spectacle frame of a metallic connecting hinge, comprising a hollow socket member having a horizontal slot therein secured in a vertical position to the end of the lens frame, a journal member having a cylindrical bearing portion revoluble in said socket and a shank portion projecting through the horizontal slot in the socket, and limited in its oscillating movement by the edges thereof and embedded in the temple, said socket also having a slot leading from the upper end thereof to the horizontal slot to permit the shank portion of the journal member to be inserted therein, and means connecting the journal and socket members to adjustably brake the oscillating movement of the temple.

16. The combination with a non-metallic spectacle frame of a metallic connecting hinge, comprising a hollow socket member, having a horizontal slot therein secured in a vertical position to the end of the lens frame, a journal member having a cylindrical bearing portion revoluble in said socket, provided with a downwardly extended threaded trunnion and a shank portion projecting through the horizontal slot in the socket, and limited in its oscillating movement by the edges thereof and embedded in the temple, said socket also having a slot leading from the upper end thereof to the horizontal slot to permit the shank portion of the journal member to be inserted therein, and a lock nut of larger diameter than the bearing portion threaded over the threaded trunnion and contacting the base of the socket member to adjustably brake the oscillating movement of the temple.

In testimony whereof I affix my signature.

CHARLES O. CARLSON.